Feb. 13, 1962 C. H. BARNETT ET AL 3,021,397

REPEATER FOR CHECKING CIRCUIT CONTINUITY OF A SIGNALING SYSTEM

Filed May 26, 1960 2 Sheets-Sheet 1

INVENTORS C.H. BARNETT
W.V.K. LARGE
H.M. PRUDEN

BY Patrick J. Roche

ATTORNEY

REPEATER FOR CHECKING CIRCUIT CONTINUITY OF A SIGNALING SYSTEM

Filed May 26, 1960 2 Sheets-Sheet 2

INVENTORS C.H. BARNETT
W.V.K. LARGE
H.M. PRUDEN

BY Patrick J. Roche

ATTORNEY 3,021,397

REPEATER FOR CHECKING CIRCUIT CONTINUITY OF A SIGNALING SYSTEM

Cecil H. Barnett, Prairie Village, Kans., Wayne V. K. Large, Locust Valley, N.Y., and Harold M. Pruden, Maplewood, N.J.; said Barnett assignor to American Telephone and Telegraph Company, said Large and said Pruden assignors to Bell Telephone Laboratories, Incorporated, both corporations of New York Filed May 26, 1960, Ser. No. 31,852
15 Claims. (Cl. 179—175.3)

This invention relates to a signaling transmission system for continuously transmitting signal pulses from a local terminal to a remote terminal in one direction and retransmitting corresponding signal pulses from the remote terminal to the local terminal in the opposite direction, and more specifically to such system utilizing a repeater for receiving the signal pulses at the remote terminal and thereafter reforming the received signal pulses into corresponding signal pulses and transmitting the latter pulses back to the remote terminal. The continuous transmission of the original signal pulses in a one-way path in one direction and of the corresponding signal pulses in a one-way path in an opposite direction serve to check continuously the operativity of the overall signaling transmission system.

In a known signaling system comprising a headquarters terminal and a plurality of subsidiary terminals integrated into an aircraft alerting system, the overall system may be used under a nonalert condition for voice transmission between the several stations and under an alert condition for the transmission of an emergency signal from the headquarters terminal to all subsidiary terminals at the same time. It is therefore imperative to maintain the overall system in an operative condition at all times for the initiation and transmission of the alert signal. If, on the other hand, it should happen that a particular circuit is incapable of handling a transmitted signal at a given time due to a trouble condition thereon, this should be made known immediately to the headquarters terminal so that appropriate steps may be initiated thereat to clear the trouble condition and at the same time to provide for an alternate route to transmit the alert signal from the headquarters terminal to the particular subsidiary terminal.

The present invention therefore contemplates continuous checking of the continuity of a signaling transmission system to assure the continuous availability thereof for the handling of an alert signal under an emergency condition.

It is the main object of the present invention to check continuously the circuit continuity of a signaling transmission system.

It is another object to indicate immediately the occurrence of a circuit interruption in a signaling transmission system.

It is a further object to obviate the effects of "hits" in the continuous checking of the circuit continuity of a signaling transmission system.

It is still another object to monitor the continuous checking of the continuity of a signaling transmission system for the occurrence of "hits" therein, and to minimize the effects of the system in such circuit checking.

In association with a signaling system including a transmitting terminal and a receiving terminal interconnected by suitable transmission circuits equipped to effectuate opposite directions of transmission therebetween, the present invention for achieving a continuous checking of the circuit continuity of the signaling system comprises a generator of positive signal voltage pulses, each occurring once at the beginning of each of a plurality of repetitive signaling cycles of preselected time duration, located at the transmitting terminal and a repeater at the receiving terminal for receiving thereat the signal pulses originated at the transmitting terminal, reforming the received signal pulses as duplicates thereof and then transmitting the duplicated signal pulses back to the main headquarters terminal to indicate the signaling circuits are continuous and thereby available for the handling of alert signals under emergency conditions.

The repeater comprises a signal channel including a first amplifier including a control grid biased to cutoff conduction therein and an anode activated with a source of positive voltage, a second amplifier including a control grid and a cathode, a first resistor connecting the last-mentioned cathode to a source of negative potential, a first capacitor connected between the anode of the first amplifier and positive voltage source and the second amplifier control grid, the first capacitor charged substantially to the voltage of the positive source during conduction cutoff in the first amplifier and thereby so biasing the control grid of the second amplifier as to establish conduction therein. This conducting amplifier produces a positive voltage at its associated cathode. A third amplifier includes a control grid, a cathode and an anode, a second resistor connecting the last-mentioned cathode to the negative potential source, the last-mentioned anode connected to the source of positive voltage, the last-mentioned control grid connected to the second amplifier cathode and biased by the positive voltage thereof to establish conduction in the third amplifier whereby a negative voltage is provided at the third amplifier anode. A fourth amplifier includes a cathode and a control grid connected to the third amplifier anode, and a third resistor connected between ground and the last-mentioned cathode, the last-mentioned control grid biased by the negative anode voltage of the conducting third amplifier to cut off condition in the fourth amplifier whereby no voltage is developed across the last-mentioned cathode resistor. This constitutes the spacing conditions of the respective signaling cycles wherein no voltage pulses are sent back from the receiving terminal to the transmitting terminal.

Responsive to a positive signal pulse in one of the signaling cycles received at the control grid of the first amplifier, the latter is driven into conduction for the duration of the received pulse thereby enabling the first capacitor to discharge therethrough. The discharging first capacitor establishes a negative biasing potential on the control grid of the second amplifier to terminate the conduction therein whereby a negative voltage is produced at the second amplifier cathode. This negative potential applied to the control grid of the third amplifier serves to cut off conduction therein whereby a positive voltage is developed at the third amplifier anode. This positive voltage applied to the control grid of the fourth amplifier establishes conduction therein whereby a positive voltage pulse is developed at the fourth amplifier cathode resistor. This positive voltage pulse has the positive polarity, predetermined magnitude and time duration, and repetitive rate of the received signal pulses. Thus, the received signal pulses are reformed as duplicates thereof, and the duplicate pulses are returned to the main headquarters terminal for indicating on suitable alarm apparatus thereat the circuits traversed by the received and duplicate pulses are continuous and thereby available for the handling of the alert signal. The duplicate pulses constitute the marking conditions of the respective signaling cycles.

A pulse blocking circuit or guard channel functions at the end of each signal pulse received at the control grid of the first amplifier to prevent the development of another duplicate pulse at the fourth amplifier cathode resistor for a predetermined time interval after the received signal pulse is terminated. This blocking circuit comprises a second capacitor having one plate connected to the first amplifier anode, and a third capacitor having one plate connected to the other plate of the second capacitor and the third amplifier control grid and the opposite plate to ground; and a fourth resistor connected between the one plate of the third capacitor and the negative potential source. At the end of each received signal pulse, conduction in the first amplifier is terminated whereupon the plate voltage thereof rises to the maximum value. This charges the second and third capacitors in series substantially to the voltage of the positive source. This third capacitor charge will be dissipated in paths including the fourth resistor and the conducting third amplifier whereby a positive voltage is supplied to the control grid of the third amplifier for maintaining conduction therein for approximately the last-mentioned predetermined time interval. This is due to the fact that the time constant of the third capacitor and the discharge paths therefor enable the third capacitor to retain sufficient positive voltage charge to maintain conduction in the third amplifier for the last-mentioned predetermined time interval thereby precluding the development of a voltage at the fourth amplifier cathode resistor during the last-mentioned period. Thus, the signal channel is blocked for the last-mentioned predetermined time interval after each signal pulse is received at the control grid of the first amplifier so that any pulse occurring less than the predetermined time interval after the first pulse will be precluded from transmission to the main headquarters terminal.

A false or "hit" pulse received at the control grid of the first amplifier during the blocking period establishes conduction therein whereupon the fully charged first capacitor will commence immediately to discharge through the conducting first amplifier. This serves to bias the second amplifier to cut off conduction therein to produce the negative voltage at the cathode thereof. This negative voltage tends to bias the third amplifier to cut off conduction therein, but is precluded from achieving such cutoff for the reason that the conduction is maintained in the third amplifier in a manner which will be presently mentioned.

Upon the termination of conduction in the first amplifier at the termination of the afore-noted false pulse, the plate voltage of that amplifier rises to the maximum positive voltage to charge the second and third capacitors in series to a correspondingly high positive voltage as previously mentioned. Also, as afore-noted, the second capacitor will be awaiting its normally discharge interval through the first amplifier upon the establishment of conduction therein by the next succeeding legitimate signal pulse received at the control grid of the first amplifier. Since the false pulse occurred during the normally blocking period occasioned by the legitimate pulse, it is apparent that while the third capacitor did discharge to some extent during the blocking period, it did not entirely discharge. To whatever voltage charge still remains on the third capacitor at this point, an incremental charge will be added thereto from the last-mentioned charge effective on the second capacitor. Now, the third capacitor will commence to discharge for a new predetermined blocking period to apply a positive voltage to the third amplifier control grid thereby overcoming the last-mentioned negative voltage also applied thereto at the same time. This positive voltage serves to maintain the third amplifier in conduction whereby the fourth amplifier will be caused thereby to remain biased to cutoff during the last-mentioned predetermined blocking period. As a consequence, the fourth amplifier will be precluded from transmitting not only the false pulse but also the legitimate signal pulse occurring in the signaling cycle next-succeeding the signaling cycle in which the false pulse occurred. Thus a legitimate signal pulse occurring during a blocking period occasioned by a false pulse will not be transmitted; while, on the other hand, a false pulse occurring during a blocking period due to a legitimate signal pulse will not be transmitted. In view of the partial discharge of the third capacitor in the guard channel, it is evident that the blocking period due to the legitimate signal pulse will overlap the blocking period occasioned by the false pulse whereby the overall blocking time due to a legitimate pulse and a false pulse occurring in succession will be more than two seconds but less than four seconds.

The invention will be readily understood from the following description when taken together with the accompanying drawing in which.

Figure 1:
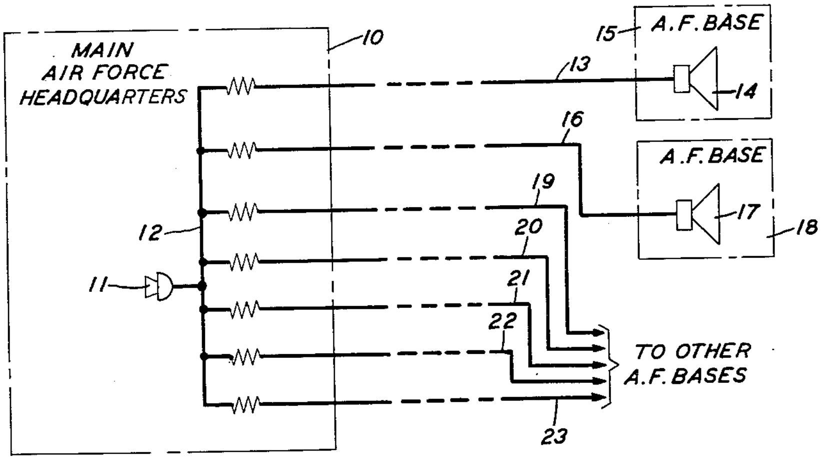
FIG. 1 is a single line diagram of a signaling system which may include a specific form of the invention delineated in FIG. 3.

A signaling system shown via single line diagram in FIG. 1 and adapted to include the present invention described below comprises a main air force headquarters 10 including telephone equipment 11 suitable for originating an alert signal on an emergency basis and connected to a ready-to-use voice-frequency signaling system 12. The system connects the alert telephone via direct circuit 13 to a loudspeaker 14 positioned in air force base 15 and direct circuit 16 to a loudspeaker 17 positioned in air force base 18. In a similar manner the alert telephone may be connected via circuits 19 through 23 to like loudspeakers at other air force areas, not shown. It is therefore evident in FIG. 1 that an alert signal originating in the telephone equipment located at the main air force headquarters in a manner mentioned later herein may be simultaneously transmitted at a given moment to all air force bases and received thereat substantially at the same time, provided that all interconnecting circuits are in an operative condition. In this connection, it will be understood that while the main air force headquarters is shown connected to two air force bases, it may also be connected via the circuits 19 through 23 to a plurality of other air force headquarters and bases in a similar manner. As a consequence, the present invention referred to hereinafter is directed to equipment for enabling a continuous checking of the continuity of the several circuits interconnecting the main headquarters with the several air force bases in a manner that will be subsequently described.

Figure 2:
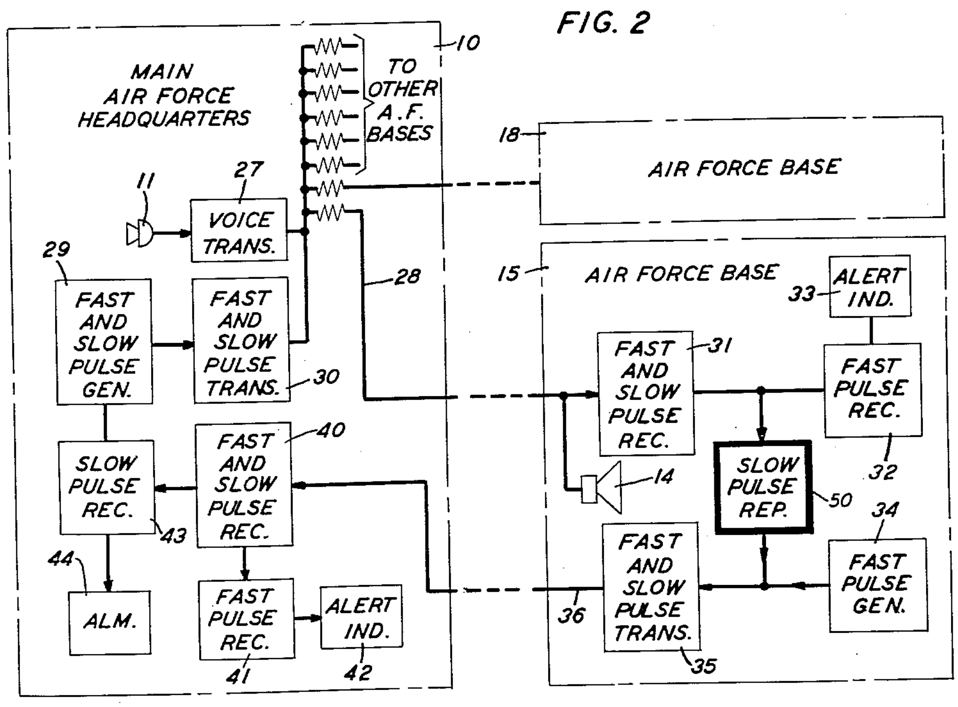
FIG. 2 is a block diagram of the signaling system shown in FIG. 1 and utilizing the invention illustrated in FIG. 3.

Referring now to FIG. 2 which shows the system of FIG. 1 in a box diagram and includes the same reference numerals for identifying corresponding equipments in both figures, the main air force headquarters 10 includes the alert telephone 11 connected through suitable voice transmitting equipment 27 to an outgoing transmission line 28 adapted in the well-known manner, not shown, for signaling transmission in the direction from left to right in FIG. 2. In the main headquarters, a fast and slow pulse generator 29 is connected to the input of a fast and slow pulse transmitter 30 whose output is connected to the outgoing line 28. This line, in air force base 15, is terminated in loudspeaker 14 and also in the input of a fast and slow pulse receiver 31 whose output is connected to a fast pulse receiver 32, and an alert indicator 33 in sequence.

Also, in air force base 15, a fast pulse generator 34 is connected to the input of a fast and slow pulse transmitter 35 which is identical with transmitter 30 and which has its output connected to an outgoing transmission line 36 extending from air force base 15 to the main headquarters 10. The line 36 is adapted in the well-known manner, not shown, for signaling transmission from right to left in FIG. 2. At the main headquarters 10, line 36 is terminated in the input of a fast and slow pulse receiver 40 which is identical with the receiver 31 and which has one output connected to a fast pulse receiver 41 and alert indicator 42 in sequence, and a second output to a slow pulse receiver 43 and alarm 44 in sequence.

In the operation of the signaling system thus far described with reference to FIGS. 1 and 2, the initiation of an alert at the main headquarters is effected by actuating a suitable button, not shown, on pulse generator 29. This will cause the production of fast pulses, each having a time duration say, for example, of 100 milliseconds, at the rate of five pulses per second on a direct-current basis. The direct-current pulses will be translated into corresponding alternating-current pulses in transmitter 30 in the well-known manner and applied to line 28. At the air force base, the alternating-current pulses are retranslated into fast direct-current pulses which are identical with those produced in the generator 29 at the main headquarters. These fast direct-current pulses are applied to fast pulse receiver 32 which is thereby caused to activate alert indicator 33 for announcing an audible signal and/or flashing a lamp, not shown. Alert indicator 33 includes a second key, not shown, for turning it off.

The activation of alert indicator 33 informs the personnel at the air force base that an alert signal is impending. This personnel acknowledges receipt of the alert signal to the main headquarters by operating a key, not shown, but included in fast pulse generator 34 which proceeds to generate new fast pulses on a direct-current basis. These fast pulses are translated into corresponding alternating-current pulses by pulse transmitter 35 and sent out over line 36 to the main headquarters. At the latter point, the received alternating-current pulses are retranslated into direct-current pulses and applied to fast pulse receiver 41. This receiver is thereby caused to activate alert indicator 42 for announcing an audible signal and/or flashing a lamp, not shown. This informs the main headquarters that the impending alert was received at the air force base and the personnel thereat are awaiting further information.

Now, the duty officer at the main headquarters speaks his message into transmitter 11 thereat. This message, sent out over line 28 on a voice-frequency basis in the well-known manner, is received at the air force base and translated via loudspeaker 14 thereat into an audible message of appropriate level for announcing the details of the alert to all personnel located in proximity of the loudspeaker at that time. In a similar manner, the main headquarters may communicate with air force base 18. In the foregoing operation, it will be understood an appropriate band elimination filter, not shown, will be included in voice transmitter 27 at the main headquarters to preclude interference of the voice currents with the receiver 31 at the air force base when the latter is operating in an equivalent frequency range. In one instance, for example, the pulse transmitter 30 and receiver 31 may operate to send and receive, respectively, frequency modulated signals centered at a midfrequency of 2635 cycles per second for the one direction of transmission whereas the transmitter 35 and receiver 40 may operate to send and receive frequency modulated signals centered at 2465 cycles per second for the opposite direction of transmission. While the circuit of FIG. 2 omits normal telephone sets for the purpose of simplifying the instant description, it will be understood that such sets may be utilized at the main headquarters and air force bases to enable voice communication therebetween in the well-known manner when the overall system is not being employed to transmit alert signals; and further the last-mentioned telephone sets will include band elimination filters for the purpose hereinbefore mentioned.

The present invention involving a slow pulse repeater 50 shown in heavy lines in FIG. 2 and usable for the continuous checking of the continuity of the simplified signaling system illustrated in FIGS. 1 and 2 will now be described. Referring to FIGS. 1 and 2, it wil be assumed that the signaling system is functioning in a nonalert condition and is therefore available for line continuity checking in a manner that will now be explained. For this purpose, generator 29 at the main air force headquarters is producing a succession of direct-current slow pulses, each having a positive polarity and occurring for a 100-millisecond time interval at the beginning of a plurality of repetitive signaling cycles, each of a 3-second duration. These pulses are translated via transmitter 30 into corresponding frequency-modulated alternating-current pulses having a frequency centered at 2635 cycles per second. At the air force base 15, the alternating-current pulses are applied to the input of receiver 31 and translated thereby into corresponding direct-current pulses which are passed through slow pulse repeater 50 into the input of transmitter 35 in a manner that will be presently explained. In this transmitter, the direct-current pulses are translated into corresponding frequency modulated alternating-current pulses having a frequency centered at 2465 cycles per second. These alternating-current pulses are transmitted over line 36 back to the main headquarters receiver 40 and translated thereby into corresponding direct-current pulses. These are then supplied to the input of a slow pulse receiver 43 whose output is connected to an alarm 44 for continuously checking the continuity of the overall signaling system as explained in our copending application assigned to the same assignees.

Referring back to the output of receiver 31 at the air force base, it will be understood, as hereinbefore mentioned, that the slow pulses will be rejected by the fast pulse receiver 32 but accepted and passed through the slow pulse repeater 50 in the manner mentioned hereinafter. It will be thus apparent that the fast pulses employed for announcing an impending alert on the system will not interfere wtih the operation of the circuit continuity checking of the signaling system whereas the slow pulses will not interfere with the announcement of the impending alert thereon. It will be further understood that an identical arrangement obtains in the main headquarters in which the output of receiver 40 is supplied to inputs of fast pulse receiver 41 and slow pulse receiver 43.

Figure 3:
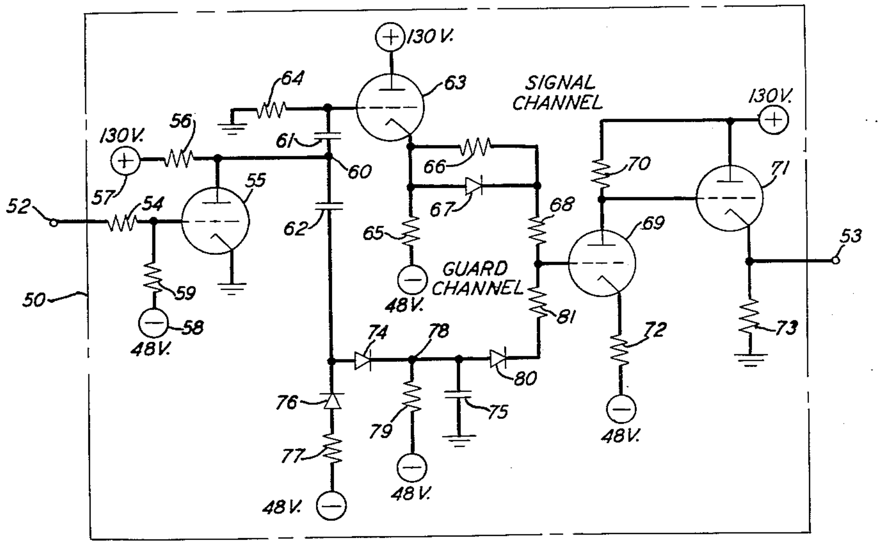
FIG. 3 is a schematic diagram of a specific embodiment of the invention utilized in FIG. 2.

In accordance with the slow pulse repeater 50 of the present invention, the repeater has its input terminal 52 connected to the output of fast and slow pulse receiver 31 for receiving direct-current pulses therefrom and its output terminal 53 to the input of fast and slow pulse transmitter 35 for supplying corresponding direct-current pulses thereto, as illustrated in FIGS. 2 and 3. Each incoming signal pulse at input terminal 52 will be transmitted through the repeater and substantially duplicated at output terminal 53 in a manner that will be presently explained. The duplicated output pulses serve to activate transmitter 35 which transmits corresponding carrier voltages over outgoing transmission line 36 to the fast and slow receiver 40 included in the main air force headquarters. In the latter receiver the carrier voltages are retranslated into corresponding direct-current pulses which serve to activate: (1) fast pulse receiver 41 and alert indicator 42 and (2) slow pulse receiver 43 and monitor and alarm 44 as hereinbefore mentioned.

In FIG. 3, input terminal 52 is connected through resistor 54 to the control grid of triode 55, which has its cathode grounded and its plate energized through resistor 56 by a source 57 of +130 volts. A source 58 of negative 48 volts is connected via resistor 59 to the control grid of triode 55. The positive and negative voltage sources mentioned hereinafter will be understood to refer to the positive and negative voltage sources 57 and 58 respectively. The anode of triode 55 is connected to a terminal 60 which is common to adjacent plates of parallel capacitors 61 and 62. The other plate of capacitor 61 is connected to the control grid of triode 63 and through resistor 64 to ground. The anode of triode 63 is directly energized by the +130-volt source.

The cathode of triode 63 is connected via resistor 65 to the negative 48-volt source, and further via parallel resistor 66 and diode 67 in series with resistor 68 to the control grid of triode 69. The diode 67 has its anode connected to the cathode of triode 63 and its cathode to resistor 68 and is thereby poled for the efficient conduction of direct current in the low-resistance path from the cathode of triode 63 to the control grid of triode 69. The latter triode has its anode connected via load resistor 70 to the +130-volt source and also directly to the control grid of triode 71, and in addition has its cathode connected through resistor 72 to the negative 48-volt source. Triode 71 has its anode connected directly to the +130-volt source and its cathode through resistor 73 to ground; and output terminal 53 is common to resistor 73 and cathode of the triode. Thus, triode 71 is connected in the familiar cathode follower circuit. The circuit portion including triode 55, capacitor 61, triodes 63, 69 and 71, and associated apparatus constitute a signal channel whose function and operation will be subsequently described.

The other plate of capacitor 62 is connected via diode 74 to one plate of capacitor 75 whose opposite plate is grounded, and also via diode 76 and resistor 77 in series to the negative 48-volt source. It will be noted that diode 74 has its anode connected to the other plate of capacitor 62 and its cathode to capacitor 75 and is thereby poled for the efficient conduction of current in a direction from capacitor 62 toward capacitor 75 while at the same time blocking current flow from the negative source through resistor 79 to capacitor 62; and diode 76 has its anode connected to the negative voltage source and its cathode to the other plate of capacitor 62 and is thereby poled to preclude current flow from the latter source through resistor 77 to capacitor 62. A point 78 common to diode 74 and capacitor 75 is connected via resistor 79 to the negative 48-volt source. The one plate of capacitor 75 is also connected via diode 80 and resistor 81 in series to the control grid of triode 69. Diode 80 has its anode connected to capacitor 75 and its cathode to resistor 81 and is thereby poled for the efficient conduction of direct current from capacitor 75 to the control grid of triode 69. The circuit portion comprising triode 55, capacitors 62 and 75, diodes 74, 76 and 80, negative 48-volt source, and associated apparatus constitute a guard channel whose function and operation will be later mentioned.

In the operation of the invention shown in FIG. 3, it will be initially assumed that the signal channel is awaiting the arrival of a signal pulse, that is, the repeater is momentarily resting in a spacing condition. As a consequence, triode 55 is nonconducting due to the bias on its control grids as derived via resistor 59 from the associated negative 48-volt source; capacitor 61 is charged via resistors 56 and 64 substantially to the voltage of the +130-volt source 57; triode 63 is conducting because its control grid is positive relative to the voltage of its associated cathode; and the conduction path in triode 63 includes the associated cathode resistor 65 and negative 48-volt source for establishing a positive voltage at the cathode of triode 63 at this time; triode 69 is conducting due to the positive voltage effective on its control grid as derived from the cathode of triode 63 via diode 67 and resistor 68; triode 71 is nonconducting due to a negative voltage applied to its control grid and derived from the anode resistor 70 of conducting triode 69; and capacitors 62 and 75 are charged.

Figure 4:
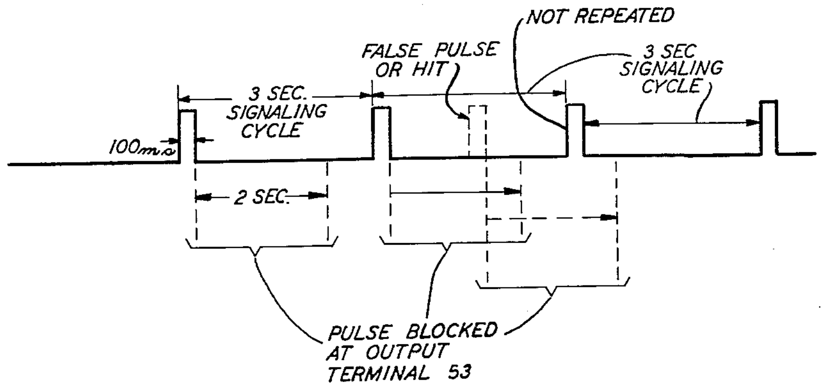
FIG. 4 comprises a group of curves illustrating action obtainable in FIG. 3.

Assuming now a 100-millisecond signal pulse shown in FIG. 4 is applied to input terminal 52 in FIG. 3, this pulse will overcome the bias on the control grid of triode 55 for a 100-millisecond time interval thereby establishing conduction in the triode for such period of time. At the instant of such conduction, capacitor 61 charged to approximately +130 volts as previously mentioned commences to discharge via conducting triode 55 and resistor 64. This provides a negative potential at the terminal of resistor 64 connected to the control grid of the now conducting triode 63 whereupon conduction therein is terminated. As a consequence, a negative voltage is now effective at the cathode of nonconducting triode 63; and this voltage is applied via series resistors 66 and 68 to the control grid of conducting triode 69 to terminate conduction therein. This permits the anode voltage of triode 69 to rise approximately to +130 volts through load resistor 70. This positive voltage substituted for the negative bias theretofore effective on the control grid of nonconducting triode 71 serves to establish conduction therein which thereupon develops a positive voltage across its cathode resistor 73. This voltage is available at output terminal 53. A voltage pulse will be thus developed at cathode resistor 73 in response to each signal pulse applied to input terminal 52. The developed voltage pulse will be substantially identical in polarity, magnitude, and time duration, and rate of repetition with the signal voltage pulses applied to input terminal 52. The developed pulses will be sent by transmitter 35 over line 36 to the main headquarters for the purpose previously mentioned. The development of each pulse constitutes the marking condition of the repeater 50. At the end of each signal pulse received at input terminal 52, the repeater 50 will be returned to the spacing condition.

As the reception of the slow signal pulses will be on a routine basis, then the alarm 44 at the main air force headquarters will not be operated. This will suffice to indicate the operativity of the signaling circuit traversed by the signal pulses, as mentioned in our copending application, Serial No. 31,924, filed on even date herewith.

In the event, however, of a failure of the slow pulses to arrive at the slow pulse receiver 43 for at least a predetermined time interval as mentioned in our copending application, supra, then the alarm 44 would be activated to announce to the personnel at the main headquarters 10 the occurrence of a discontinuity in the overall transmission system previously identified. The personnel could then take steps to identify and obviate the condition giving rise to circuit discontinuity while at the same time to select an alternate route for the alert signal.

It will be noted that a signal pulse having a time duration in excess of 100 milliseconds and applied to input terminal 52 in FIG. 3 serves to establish conduction in triode 55 whereupon charged capacitor 61 is discharged therethrough to terminate conduction in triodes 63 and 69 as hereinbefore mentioned. This would initiate conduction in triode 71 at the start of the last-mentioned input pulse whereby the transmission of a pulse from output terminal 53 is commenced in the manner hereinbefore described. After approximately 100 milliseconds, the discharge of capacitor 61 would be insufficient to bias triode 63 to cut off therein in the manner previously mentioned whereupon conduction will be reestablished in triode 63. Again the positive cathode voltage of triode 63 applied via diode 67 and resistor 68 to the control grid of triode 69 reestablishes conduction therein. As a consequence, a negative voltage effective at the anode of triode 69 would be applied again to the control grid of triode 71 which is thereby biased to nonconduction. This terminates the transmission of the pulse from output terminal 53, and at the same time reestablishes the spacing condition in the circuit of FIG. 3. It is thus evident that as a consequence of the action of capacitor 61 only the first 100 milliseconds of the input pulse of excessive time duration would be duplicated at and transmitted from output terminal 53.

A pulse blocking circuit functions at the termination of each signal pulse received at input terminal 52 to maintain sufficient conduction in triode 69 for preventing the establishment of conduction in triode 71 for a preselected time period of at least 2 seconds after the termination of the signal pulse as illustrated in FIG. 4, in a manner that will now be explained. At the end of the 100-millisecond signal pulse received at input terminal 52, conduction in triode 55 is terminated so that its plate voltage rises via resistor 56 approximately to the +130 volts of source 57 to charge capacitors 62 and 75 in series to a corresponding positive voltage, as hereinbefore mentioned. The positive voltage charge on capacitor 75 will be dissipated through resistor 79 and the negative 48-volt source connected in circuit therewith and through diode 80 and resistor 81 in series, the control grid of conducting triode 69, cathode resistor 72, and the negative 48-volt source connected therewith.

The positive charge on capacitor 75 thus serves to block further action in the repeater shown in FIG. 3 for a period of the order of 2 seconds, commencing at the end of the signal pulse received at input terminal 52, in regard to the transmission of a duplicate signal pulse from output terminal 53. Capacitor 75 and the afore-identified discharging path therefor are provided with such time constant that the positive charge retained on the capacitor will be sufficient to maintain conduction in triode 69 for the last-mentioned two-second time interval. It is thus evident that a pulse occurring at the input terminal 52 within 2 seconds after the termination of another input pulse received thereat will not be transmitted at output terminal 53, as illustrated in FIG. 4.

Capacitor 62 will be discharged through triode 55 when it conducts in a path including the conducting triode, cathode ground thereof, negative 48-volt source, resistor 77 and diode 76. At that time, the plate voltage of triode 55 is reduced to a minimum magnitude. This conditions capacitor 62, upon the restoration of conduction in triode 55, to receive a voltage charge which serves to charge capacitor 75 in series therewith as hereinbefore mentioned. Diode 80 blocks the negative 48 volts through resistor 79 from the control grid of triode 69 when triode 69 is conducting. This prevents the negative voltage charge on capacitor 75 from prematurely cutting off conduction in triode 69, when the positive voltage charge on capacitor 75 is discharged to a degree at which the latter capacitor tends to be charged with the negative polarity from the associated negative 48-volt source.

When a false pulse or a "hit," due to the occurrence of an electrical phenomenon outside the circuit of FIGS. 1, 2 and 3 but impressed on these circuits connected to input terminal 52 in the well-known manner, is applied to the latter terminal within the two-second blocking period as illustrated in FIG. 4, such false pulse being of positive polarity would overcome the bias on the control grid of triode 55 whereby conduction is immediately established therein. Charged capacitor 61 commences to discharge at once in the discharge path previously traced whereupon triode 63 is biased to cut off via the negative voltage effective on its control grid as hereinbefore identified. This provides at the cathode of nonconducting triode 63 a negative voltage which is effective on the control grid of triode 69 and which thereby tends to bias the latter triode into nonconduction. This does not take place, however, for the reason that conduction is maintained in triode 69 to block transmission of the false pulse from output terminal 53 in a manner that will now be explained.

Upon the termination of conduction in triode 55 at the end of the false pulse, the plate voltage of this triode rises to the maximum positive magnitude to charge capacitor 62 to a relatively high positive voltage as previously mentioned. Capacitor 62 will be thereafter awaiting its normal discharge interval through triode 55 when the latter is driven to conduction by the next succeeding voltage pulse received at input terminal 52. Since the false pulse occurred during a normal blocking period due to a legitimate signal pulse as hereinbefore mentioned and shown in FIG. 4, it is evident that while capacitor 75 discharged to some degree during the blocking period in the afore-traced discharge path, this capacitor did not fully discharge. To whatever charge remained on capacitor 75 up to this point, an incremental voltage charge is added thereto from capacitor 62 in response to the foregoing action. Again, capacitor 75 will commence to discharge for a new two-second blocking time period thereby holding triode 69 in the conducting condition for that time period. This will cause triode 71 to remain biased to cut off conduction therein during the last-mentioned new two-second blocking period, as illustrated in FIG. 4. As a consequence, triode 71 is precluded from transmitting via output terminal 53 not only the false pulse but also the next-succeeding legitimate pulse which occurred during the last-mentioned new blocking period. In other words, the legitimate pulse occurring in the signaling cycle next-succeeding the signaling cycle in which the false pulse occurred will be blocked from transmission at output terminal 53 as illustrated in FIG. 4. Thus, a legitimate pulse occurring during a blocking period occasioned by a false pulse will not be transmitted via output terminal 53; while, on the other hand, a false pulse occurring during the blocking period due to a legitimate pulse will not be transmitted via output terminal 53. In view of the partial discharge of capacitor 75, it is evident that the blocking period due to a legitimate pulse received at input terminal 52 will effectively overlap the blocking period occasioned by the false pulse whereby the overall blocking time of the repeater will be more than two seconds but less than four seconds, as illustrated in FIG. 4.

It is to be understood that the afore-described embodiment is merely illustrative of the application of the invention. Numerous other embodiments may occur to those skilled in the art without departing from the spirit and scope of the invention.

What is claimed is:

1. In a circuit for continuously checking the continuity of a signaling system including a generator of signaling pulses having positive polarity and predetermined time duration and magnitude, each pulse occurring once at the beginning of each of a plurality of repetitive signaling cycles of preselected time duration, a first line for signaling transmission in one direction, a first transmitter connecting said generator to one end of said first line for applying said signaling pulses thereto, a first receiver at the opposite end of said first line for receiving said signaling pulses transmitted thereon, a second line for signaling transmission in the opposite direction, a second transmitter to supply signaling pulses corresponding to the received signaling pulses to one end of said second line, and a second receiver at the opposite end of said second line to receive and observe thereat the received corresponding signaling pulses, means for repeating the received signal pulses in the output of said first receiver to the input of said second transmitter, said means comprising an amplifier including a control grid and an anode, a source of positive voltage to energize said anode, said control grid connected to the output of said first receiver and normally biased to cutoff conduction in said amplifier in the absence of said signaling pulses at said control grid, a capacitor having one plate connected to said anode and source and substantially charged to the positive voltage of said source during conduction cutoff in said amplifier for supplying a positive voltage at its other plate, and means having an input and an output, said last-mentioned input connected to said other capacitor plate and responsive to the positive voltage charge thereon for producing zero voltage at said last-mentioned output, said last-mentioned output connected to the input of said second transmitter, said signal pulses received at said opposite end of said first line and applied to said control grid to overcome the normal bias thereon for establishing conduction in said amplifier during the time duration of the respective signal pulses, said capacitor discharging through said conducting amplifier to provide effectively a negative voltage at its other plate, said means responsive to the effective negative voltage at said other capacitor plate for producing a voltage pulse at said last-mentioned output, each of said last-mentioned output pulses corresponding in polarity, predetermined time duration and magnitude, and preselected repetition rate with said last-mentioned received signal pulses, whereby said second transmitter is activated to supply the corresponding signal pulses applied to said one end of said second line.

2. The circuit according to claim 1 which includes means to monitor said anode for the occurrence of said voltage pulses thereat, comprising a second input for said voltage producing means, and means including a second capacitor having one plate coupled to both said anode and first-mentioned one capacitor plate of said and another plate coupled to said second input of said voltage producing means, said second capacitor charged to the voltage of said source during conduction cutoff in said first amplifier, and a resistor connected between said other plate of said second capacitor and ground, said second capacitor discharging through a path including said resistor and said conducting amplifier for enabling said capacitor means to supply a positive voltage to said second input of said voltage producing means for maintaining the zero voltage at said output thereof, said capacitor means having such time constant as to supply the positive voltage to said second input of said voltage producing means for a certain time which is less than the preselected time duration of the respective signaling cycles.

3. The circuit according to claim 2 in which said capacitor means includes a third capacitor having one plate connected to said second capacitor other plate and said second input of said voltage producing means, said third capacitor having an opposite plate connected to ground, said third capacitor charged in series with said second capacitor substantially to the voltage of said source during conduction cutoff in said amplifier, and a second resistor connected between said second capacitor one plate and ground, said third capacitor discharging through said second resistor, said discharging of said third capacitor through said second resistor having such time constant as to supply the positive voltage to said second input of said voltage producing means for said certain time.

4. The circuit according to claim 3 in which said voltage producing means comprises a second amplifier having a control grid, said last-mentioned control grid constituting said first-mentioned input of said voltage producing means and connected to said other plate of said first-mentioned capacitor, said second amplifier control grid responsive to the positive voltage at said first-mentioned other capacitor plate to maintain conduction in said second amplifier for causing said voltage producing means to produce the zero voltage at said output thereof, said second amplifier control grid responsive to the negative voltage at said first-mentioned other capacitor plate to terminate conduction in said second amplifier for causing said voltage producing means to produce said corresponding voltage pulses at said output thereof.

5. The circuit according to claim 4 in which said second amplifier also includes a cathode, said voltage producing means also includes a third amplifier having a control grid and anode, said third amplifier control grid connected to said second amplifier cathode, and said third amplifier anode coupled to said output of said voltage producing means, said second amplifier having a positive cathode voltage in response to the conduction therein and a negative cathode voltage in response to the termination of conduction therein, said third amplifier control grid responsive to the positive cathode voltage of said second amplifier for effecting a negative voltage at said third amplifier anode thereby causing said voltage producing means to produce said zero voltage at the output thereof, said third amplifier control grid responsive to the negative cathode voltage of said second amplifier for effecting a positive voltage at said third amplifier anode thereby causing said voltage producing means to produce said corresponding voltage pulses at said output thereof.

6. The circuit according to claim 5 in which said voltage producing means also includes a fourth amplifier including a control grid and a cathode, said last-mentioned control grid connected to said third amplifier anode, and a third resistor connected between said last-mentioned cathode and ground so that said fourth amplifier is effectively a cathode follower, and a terminal common to said last-mentioned cathode and resistor and constituting said output of said voltage producing means, said fourth amplifier control grid responsive to the negative anode voltage of said third amplifier for cutting off conduction in said fourth amplifier thereby producing the zero voltage at said common terminal, said fourth amplifier control grid responsive to the positive anode voltage of said third amplifier for restoring conduction in said fourth amplifier thereby producing the corresponding voltage pulses at said common terminal.

7. In a circuit for continuously checking the continuity of a signaling system including a generator of signaling pulses having positive polarity and predetermined time duration and magnitude, each pulse occurring once at the beginning of each of a plurality of repetitive signaling cycles of preselected time duration, a first line for signaling transmission in one direction, a first transmitter connected between said generator and one end of said first line to apply said signaling pulses thereto, a first receiver at the opposite end of said first line to receive the signaling pulses transmitted thereon, a second line for signaling transmission in the opposite direction, a second transmitter to supply signaling pulses corresponding to the received signaling pulses to one end of said second line, a second receiver at the opposite end of said second line to receive and observe thereat the received corresponding signaling pulses, means to repeat the signaling pulses in the output of said first receiver to the input of said second transmitter, said means comprising a first amplifier including a control grid and an anode, a source of positive voltage to activate said anode, said grid connected to the output of said first receiver and biased to cut off conduction in said first amplifier in the absence of said signaling pulses at said grid, a second amplifier including a control grid and a cathode, a source of negative voltage connected to said cathode, a first capacitor connected between said first amplifier anode and said second amplifier grid, said first capacitor charged substantially to the voltage of said positive source during conduction cutoff in said first amplifier, said second amplifier having conduction established therein when said first capacitor is charged to overcome the negative voltage at said last-mentioned cathode for developing a positive voltage thereat, a third amplifier including a cathode, a control grid and an anode, said last-mentioned anode activated with the positive voltage of said source, said last-mentioned cathode connected to said negative voltage source, said third amplifier having its control grid biased by said positive cathode voltage of said second amplifier for establishing conduction in said third amplifier whereby a negative voltage is provided at said third amplifier anode, a fourth amplifier including a control grid and a cathode, a resistor connected between said last-mentioned cathode and ground, and a terminal common to said last-mentioned cathode and resistor connected to the input of said second transmitter, said last-mentioned control grid supplied with said negative potential provided at said anode of said conducting third amplifier to cut off conduction in said fourth amplifier whereby no voltage is developed across said last-mentioned resistor and no voltage is provided at said common terminal, said first-mentioned control grid responsive to signal pulses thereat to drive said first amplifier into conduction during the time duration of each of said signal pulses, said first capacitor discharging through said conducting first amplifier for the time duration of each of said signal pulses to bias said second-mentioned control grid with a negative voltage for cutting off conduction in said second amplifier whereby a negative voltage from said negative source is effectively provided at said cathode of said last-mentioned amplifier and supplied to said control grid of said third amplifier to cut off conduction therein, said conduction cutoff in said third amplifier establishing a positive voltage at said anode thereof thereby supplying such positive voltage to said control grid of said fourth amplifier, said last-mentioned control grid positive voltage establishing conduction in said fourth amplifier to develop a positive voltage across said cathode resistor thereof and provided at said common terminal in response to each of said signal pulses applied to said first-mentioned control grid, said last-mentioned common terminal voltage having the polarity, predetermined magnitude and time duration, and repetitive rate of each of said signal pulses.

8. The circuit according to claim 7 for monitoring said first-mentioned control grid for false pulses, which includes a second capacitor having one plate connected to said first capacitor and first amplifier anode, a third capacitor having one plate connected to another plate of said second capacitor and said third amplifier control grid, said third capacitor having an opposite plate connected to ground, a second resistor having one terminal connected to said third capacitor one plate and an opposite terminal connected to said negative voltage source, said second and third capacitors charged in series by the voltage of said source during conduction cutoff in said first amplifier, said third capacitor positive charge biasing said third amplifier control grid to maintain conduction in said third amplifier and at the same time discharging through said second resistor and conducting third amplifier, said third capacitor and said second resistor and conducting third amplifier in the discharge path therefor having such time constant as to maintain conduction in said third amplifier and thereby nonconduction in said fourth amplifier after the termination of each of said pulses at said input terminal for a further preselected period of time which is less than said first-mentioned preselected time duration, said last-mentioned maintenance of conduction in said third amplifier and nonconduction in said fourth amplifier precluding the development of a voltage at said common terminal in response to a pulse occurring at said input terminal during said further preselected time period.

9. The circuit according to claim 8, in which a false pulse is received at said first amplifier control grid during said further preselected time period, said first, second and third capacitors charged with the voltage of said positive source during the conduction cutoff in said first amplifier, said false pulse driving said first amplifier into conduction during the time duration of said false pulse, said first capacitor discharging through said last-mentioned conducting first amplifier during the time duration of said false pulse to bias said second amplifier to cut off for providing therein a negative cathode voltage which is applied to said third amplifier control grid thereby tending to cut off conduction in said third amplifier, said second capacitor discharging simultaneously with the discharge of said first capacitor through said last-mentioned conducting first amplifier during the time duration of said false pulse, said third capacitor also discharging through said second resistor and conducting third amplifier but continuing to apply a positive voltage to said third amplifier control grid for overcoming the last-mentioned negative voltage applied thereto thereby maintaining conduction in said third amplifier, said second capacitor again charged by the voltage of said positive source upon the return of said first amplifier to conduction cutoff thereby adding a positive voltage charge to the positive charge then remaining on said third capacitor, said added and remaining charges on said third capacitor maintaining conduction in said third amplifier and thereby conduction cutoff in said fourth amplifier for a second further preselected time period which partly overlaps said first-mentioned further preselected time period, said second further preselected time period precluding the development of a voltage at said common terminal in response to the signal pulse occurring in the signaling cycle next following the signaling cycle in which said false pulse occurred.

10. The circuit according to claim 9 which includes a diode having its anode connected to said second amplifier cathode and its cathode to said third amplifier control grid for establishing a low resistance direct-current path between said second amplifier cathode and third amplifier control grid for the positive voltage effective on said second amplifier cathode.

11. The circuit according to claim 10 which includes a third resistor connected between said second amplifier cathode and negative voltage source, and a fourth resistor connected between said third amplifier control grid and a point common to said second amplifier cathode and third resistor, said fourth resistor connected in parallel with said diode, said third and fourth resistors applying said negative voltage at said second amplifier cathode to said third amplifier control grid during conduction cutoff in said second amplifier.

12. The circuit according to claim 11 which includes a second diode having its anode connected to said one plate of said third capacitor and its cathode to said third amplifier control grid to block the voltage of said negative voltage source from said last-mentioned control grid thereby precluding a premature cutoff of conduction in said third amplifier.

13. The circuit according to claim 12 which includes a third diode having its anode connected to said other plate of said second capacitor and its cathode to said one plate of said third capacitor for blocking current flow from said negative voltage source through said second resistor to said second capacitor.

14. A circuit according to claim 13 which includes a fifth resistor having one terminal connected to said negative voltage source, and a fourth diode having its anode connected to another terminal of said fifth resistor and its cathode connected to said other plate of said second capacitor and said anode of said third diode, said fourth diode precluding current flow from said last-mentioned negative voltage source and through said fifth resistor to said second capacitor.

15. The circuit according to claim 14 which includes a sixth resistor having one terminal grounded and an opposite terminal connected to said first capacitor and second amplifier control grid, said first capacitor discharging through both said conducting first amplifier and sixth resistor in response to each signal pulse received at said first amplifier control grid for developing a negative voltage at said opposite terminal of said sixth resistor to bias said control grid of said second amplifier and thereby to cut off conduction therein.

No references cited.